United States Patent
Roche

(10) Patent No.: US 10,331,155 B1
(45) Date of Patent: Jun. 25, 2019

(54) NETWORK ADDRESSABLE POWER SOCKET AUTOMATION

(71) Applicant: Amazon Technologies, Inc., Seattle, WA (US)

(72) Inventor: Kyle Michael Roche, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 334 days.

(21) Appl. No.: 14/967,072

(22) Filed: Dec. 11, 2015

(51) Int. Cl.
*G05F 1/66* (2006.01)
*G05B 15/02* (2006.01)
*H04W 4/80* (2018.01)

(52) U.S. Cl.
CPC .............. *G05F 1/66* (2013.01); *G05B 15/02* (2013.01); *H04W 4/80* (2018.02)

(58) Field of Classification Search
None
See application file for complete search history.

(56) References Cited

U.S. PATENT DOCUMENTS

| | | | | |
|---|---|---|---|---|
| 6,631,309 B2 * | 10/2003 | Boies | ..................... | G06Q 30/02 700/286 |
| 6,819,097 B2 * | 11/2004 | Chen | ..................... | G06Q 50/06 324/103 R |
| 7,996,164 B2 * | 8/2011 | Hamilton, II | ............ | A63F 13/12 340/3.9 |
| 8,090,480 B2 * | 1/2012 | Brumfield | ............... | G01R 22/10 340/3.1 |
| 8,113,855 B2 * | 2/2012 | Green | ..................... | H01R 13/44 439/131 |
| 8,265,776 B2 * | 9/2012 | Osann, Jr. | ............... | G06Q 50/06 700/22 |
| 8,374,729 B2 * | 2/2013 | Chapel | ................ | H02J 13/0082 700/295 |
| 8,395,900 B2 * | 3/2013 | Schrempp | ............... | G06F 1/189 361/729 |
| 8,648,607 B2 * | 2/2014 | Pasek | ....................... | G01D 4/00 324/522 |
| 8,762,746 B1 * | 6/2014 | Lachwani | ............... | G06F 1/266 713/300 |
| 8,781,502 B1 | 7/2014 | Middleton et al. | | |
| 9,362,765 B1 * | 6/2016 | Blaszczak | ............ | H01R 31/065 |

(Continued)

FOREIGN PATENT DOCUMENTS

| | | | | |
|---|---|---|---|---|
| WO | WO 2005076416 A1 * | 8/2005 | ......... | H01R 13/6666 |
| WO | WO 2009124292 A2 * | 10/2009 | ........... | G01R 22/063 |

*Primary Examiner* — Michael Lebentritt
(74) *Attorney, Agent, or Firm* — Thorpe North & Western, LLP.

(57) ABSTRACT

A technology is described for applying automation rules to network addressable power sockets. An example method may include receiving a power socket identifier for a network addressable power socket that detects an electrical device connected to the network addressable power socket via a wireless communication protocol. Receiving a unique identifier for the electrical device detected by the network addressable power socket. The network addressable power socket and the electrical device may be identified using the power socket identifier and the unique identifier, and an automation rule may be obtained that determines the functionality of the electrical device. The automation rule may then be applied to either of the network addressable power socket or the electrical device.

20 Claims, 11 Drawing Sheets

(56) References Cited

U.S. PATENT DOCUMENTS

| | | |
|---|---|---|
| 9,674,124 B1 | 6/2017 | Fisher et al. |
| 9,715,698 B2 | 7/2017 | Middleton et al. |
| 9,733,960 B2* | 8/2017 | Delamare ............ G06F 9/45533 |
| 9,772,812 B1* | 9/2017 | Webster ................ G06F 3/1423 |
| 9,787,848 B2 | 10/2017 | Kaye et al. |
| 9,978,260 B2* | 5/2018 | Lee ..................... H04L 12/2818 |
| 2002/0038153 A1* | 3/2002 | Amodeo ............ G08B 13/1418 |
| | | 700/1 |
| 2007/0149013 A1* | 6/2007 | Eastham ............ H01R 13/7036 |
| | | 439/140 |
| 2008/0046387 A1* | 2/2008 | Gopal ................... G01D 4/004 |
| | | 705/412 |
| 2011/0164509 A1* | 7/2011 | Wengrovitz ............ H04W 4/02 |
| | | 370/252 |
| 2012/0119577 A1* | 5/2012 | Clarke ..................... H02J 3/14 |
| | | 307/40 |
| 2012/0280833 A1* | 11/2012 | Jonsson ................ G06F 13/385 |
| | | 340/870.02 |
| 2012/0317628 A1* | 12/2012 | Yeager ................ G06Q 20/204 |
| | | 726/5 |
| 2014/0115668 A1 | 4/2014 | Stuntebeck et al. |
| 2014/0159864 A1* | 6/2014 | Allen ..................... G08C 17/02 |
| | | 340/5.61 |
| 2015/0079942 A1 | 3/2015 | Kostka et al. |
| 2015/0120246 A1* | 4/2015 | Shrubsole .......... H05B 37/0245 |
| | | 702/182 |
| 2016/0165660 A1* | 6/2016 | Delamare ................ H04B 3/54 |
| | | 455/41.1 |
| 2016/0189324 A1 | 6/2016 | Eramian et al. |
| 2016/0248738 A1* | 8/2016 | Brandsma ............ H04B 5/0031 |
| 2016/0302036 A1 | 10/2016 | Chan et al. |
| 2017/0123622 A1* | 5/2017 | Koenders .............. G06F 3/0414 |
| 2017/0346317 A1* | 11/2017 | Hodges ................ G06F 1/1632 |
| 2018/0177065 A1* | 6/2018 | Leigh ................... H05K 7/1092 |

\* cited by examiner

NETWORK ADDRESSABLE POWER SOCKET AUTOMATION

BACKGROUND

Electronic devices have become ever-present in many aspects of society. During the course of a normal day, a person may use a smart phone, a tablet device, and a laptop computer. Automobiles have also come to rely upon electronic systems to control and monitor many features and operations. Modern home appliances such as, for example, washers, dryers, and refrigerators may be driven and controlled by electronic systems. Manufacturing facilities, building heating and cooling systems, and even farming equipment may now rely upon electronic sensors and control systems.

Advancements in communication technologies have allowed for even relatively simple electronic devices to communicate with other devices and systems over a computer network. For example, an electronic device in a manufacturing system may monitor various aspects of the manufacturing process and communicate monitoring data to other devices in the manufacturing system. Similarly, electronic sensors embedded in a building control system may monitor and communicate details regarding operation of the building's heating, cooling, and ventilation systems. Even home appliances and light switches offer the possibility of being configured with communication capabilities for purposes of transmitting status and receiving external controls.

DETAILED DESCRIPTION

Figure 1:
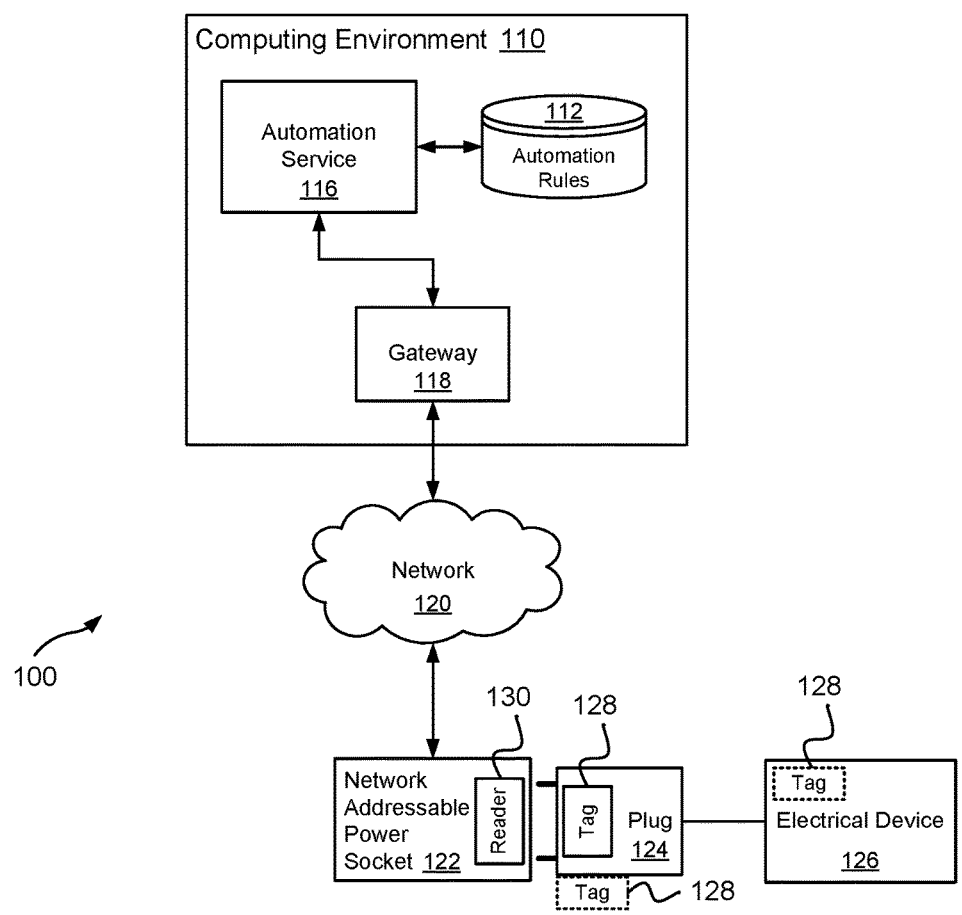
FIG. 1 is a block diagram illustrating an example system for identifying and applying an automation rule associated with an electrical device connected to a network addressable power socket.

A technology is described for associating automation rules with network addressable devices, according to various examples. In some examples, the network addressable devices may have minimal, very limited, or no computing capabilities. A network addressable device may be one of many devices that create a large network of addressable devices. This "network" is commonly referred to as the Internet of Things (IOT). The network addressable devices may be configured to communicate with services that are accessible via the network, and the services in return may communicate with the devices via the network. In particular, a network addressable device may be instructed to function according to automation rules that may be executed using a network service (e.g., a "cloud" service) or executed by the network addressable device itself.

In one example, an automation rule may be applied to or associated with a network addressable power socket configured to detect an identity of an electrical device plugged into the network addressable power socket resulting in the electrical device being controlled by the network addressable power socket according to the automation rule. For example, an automation rule used to turn on and off a light at various times of the day may be applied to a network addressable power socket that controls a lamp (e.g., with no computing device or computing power) plugged into the network addressable power socket. A network addressable power socket may include an integrated electromagnetic reader that detects an electromagnetic tag located on an electrical plug of an electrical device. When the electrical plug is engaged with the network addressable power socket, the electromagnetic tag (e.g., NFC tag) may be within proximity of the electromagnetic reader allowing the electromagnetic reader to read an identifier (e.g., a device ID) encoded on the electromagnetic tag. After reading the identifier, the network addressable power socket may be configured to send the identifier to an automation service that uses the identifier to obtain an automation rule associated with the identifier and to apply the automation rule to the network addressable power socket. For example, the automation service (e.g., a network service) may instruct the network addressable power socket to turn power on or off according to the automation rule. One more detailed example of automation rules may be automation rules that turn on and off devices in one room as a group.

In another example, an automation rule may be applied to a network addressable device according to the proximity of the network addressable device to a network addressable power socket. For example, a particular automation rule may be applied to a network addressable device when the network addressable device is plugged into a network addressable power socket or is within proximity of the network addressable power socket. As an illustration, an automation rule may be used to control the functionality of a network addressable device according to a location of the network addressable device within a home. A bedroom automation rule may be applied to the network addressable device when the network addressable device is detected in a bedroom and a kitchen automation rule may be applied to the network addressable device when the network addressable device is detected in a kitchen. The proximity of the network addressable device to a network addressable power socket may be used to determine where in the home the network addressable device is located and an automation rule associated with the location may be applied to the network addressable device.

In another example, an automation rule may be applied to a network addressable device when the network addressable device is within the proximity of a beacon configured to transmit the identity of the beacon to surrounding network addressable devices. Beacons may be placed at various locations (e.g., on or within buildings, vehicles, and outdoor spaces) and when a network addressable device comes within the proximity of a signal transmitted by the beacon, the network addressable device may be configured to send the identity of the beacon to an automation service that identifies an automation rule associated with the beacon and applies the automation rule to the network addressable device. As a result, the functionality of the network addressable device may be determined by the proximity of the network addressable device to a beacon and the automation rule associated with the beacon or multiple beacons.

In applying an automation rule to a network addressable device, the automation rule may be executed by a network service on behalf of the network addressable device and the network service may send commands to the network addressable device, or the automation rule may be executed by the network addressable device itself. For example, an automation rule may be sent to the network addressable device and the network addressable device executes the automation rule, or the automation rule may already be stored in memory of the network addressable device and the network addressable device may be instructed to execute the automation rule.

In the past, detecting a location of an electrical device that does not include location reporting capabilities has been a challenge. For instance, defining a location of an electrical device may have involved manually entering a location of the electrical device into some type of a user interface or central controller to which the electrical device is connected. Because the location for the electrical device in the past has been statically defined, the ability to dynamically update automation rules for the electrical device based on a location of the electrical device has not been possible. As a result of the current technology, the location of an electrical device, regardless of whether the device is a network addressable "smart" device or a non-network addressable "dumb" device, may be determined using an identifier for a network addressable power socket or a beacon that is in proximity to the electrical device. An automation rule may then be applied based in part on the location of the electrical device.

FIG. 1 is a diagram illustrating an example of a system 100 that may be used to identify an electrical device 126 connected to a network addressable power socket 122 via an electrical plug 124, and the system may identify an automation rule 112 associated with the electrical device 126 that may be applied to the network addressable power socket 122. As illustrated, the network addressable power socket 122 may be in communication with a computing environment 110 via a network 120 using a wireless radio, a wired network, or a power-line network adapter to establish a network connection to the network 120, through which the network addressable power socket 122 may communicate with an automation service 116 via a gateway 118. Alternatively, a network addressable power socket 122 may communicate with a local controller having an automation service, such as in a commercial building or a home.

Figure 6:
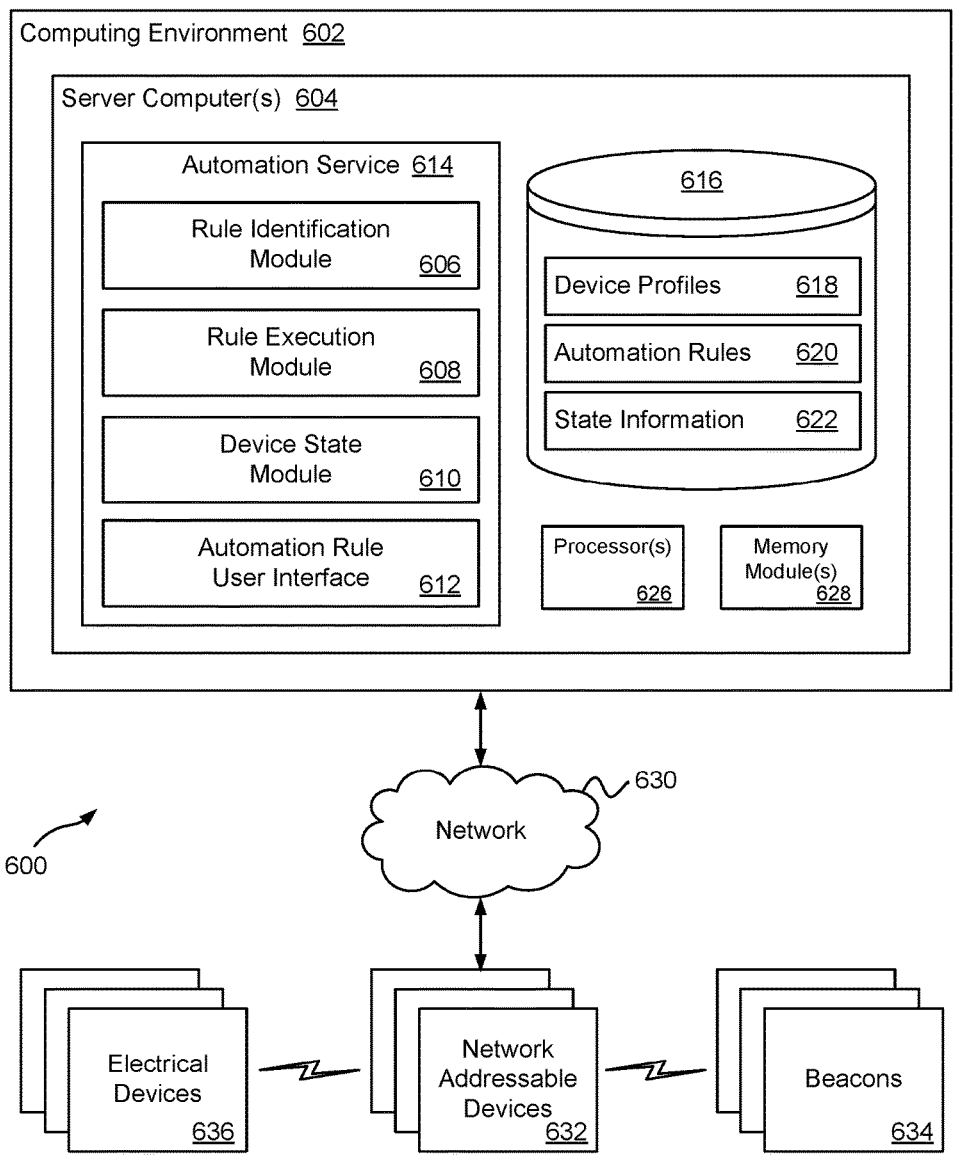
FIG. 6 is a block diagram that illustrates various example components included in a system for identifying and applying automation rules.

As described in greater detail in association with FIG. 6, a network addressable power socket 122 (as well as other network addressable devices) may access the computing environment 110 in order to access the automation service 116 and other network services such as data storage and computing processing features. Network services operating in the computing environment 110 may communicate instructions and data to network addressable devices in response to requests from the network addressable devices and/or in response to computing operations within the network services. A gateway 118 (e.g., a gateway server) may be accessible via the Internet and may operate to provide network addressable devices with access to the computing environment 110 containing computing resources and to provide computing resources in the computing environment 110 with access to connected network addressable devices.

The network addressable power socket 122 may be configured to include a reader 130, such as a RFID (Radio Frequency Identification) reader or a NFC (Near Field Communication) reader. The reader 130 may be used to read a device identifier encoded in a tag 128, such as a RFID tag or a NFC tag associated with an electrical device 126. A device identifier may be a unique identifier assigned to an electrical device 126, such as a UUID. For example, a tag 128 may be attached to the electrical plug 124 of an electrical device 126 (e.g., via an adhesive) or the tag 128 may be integrated into the electrical plug 124 (e.g., as part of the manufacturing process) so that when the electrical plug 124 is connected to the power socket 122, the tag 128 is placed within a reading proximity of the reader 130 of the power socket 122. For instance, a NFC tag may be placed between the prongs of an electrical plug 124 so that when the electrical plug 124 is connected to a power socket 122, the NFC tag comes in close contact with a NFC reader located in the power socket 122.

In another example, a tag 128 may be located on or within an electrical device 126 and the tag 128 may be read by a reader 130 located in a network addressable power socket 122 when the electrical device 126 comes within a readable distance from the reader 130. For example, an RFID tag may be placed on or in an electrical device 126 and the RFID tag may be read by an RFID reader in a network addressable power socket 122 when the electrical device 126 is within a reading range of the RFID reader.

As indicated above, a tag 128 may be encoded with an identifier that may be assigned to a particular electrical device 126 in a database record. For example, an identifier encoded in a tag 128 may be registered with the automation service 116 and the identifier may be assigned to an electrical device 126. As an illustration, a manufacturer or a customer may register an electrical device 126 with the computing environment 110 by providing an identifier encoded in a tag 128 (e.g., a device identifier) and optionally creating a device profile for the electrical device 126. Thereafter, the electrical device 126 may be identified using the device identifier obtained from the tag 128.

After registering the electrical device 126 with the automation service 116, one or more automation rules 112 may be assigned to the electrical device 126 via the automation service 116. An automation rule 112 may comprise an action that may be performed according to a condition, schedule, and/or request. An automation rule 112 may be used to control the functionality of an electrical device 126 via a network addressable power socket 122. For example, an electrical device 126 plugged into a network addressable power socket 122 may be controlled using the network addressable power socket 122 and an automation rule 112. As a specific example, an automation rule 112 may specify that a lamp connected to a network addressable power socket 122 be controlled according to a schedule (e.g., powered on between the hours of 8 pm to 10 pm), a condition (e.g., a determination that a home owner has arrived home), or a request (e.g., turn on the lamp in response to a request received at the automation service 116). The automation rule 112 may be executed using the automation service 116. For example, in determining that the current time is 8 pm, the automation service 116 sends an instruction to the network addressable power socket 122 to supply power to the lamp connected to the network addressable power socket 122, and in determining that the current time is 10 pm, the automation service 116 sends an instruction to the network addressable power socket 122 to turn power off to the lamp.

In one example, an automation rule 112 may be assigned to an electrical device 126, such that the automation rule 112 may be applied to the electrical device 126 irrespective of which network addressable power socket 122 the electrical device 126 may be connected to. Thus, in the case that the electrical device 126 may be unplugged from one network addressable power socket and plugged into another network addressable power socket, the automation rule 112 for the electrical device 126 may be preserved. As a specific example, an automation rule 112 for a coffee machine plugged into a first network addressable power socket may specify a time that the coffee machine is powered on in the morning. In disconnecting the coffee machine from the first network addressable power socket and connecting the coffee machine to a second network addressable power socket, the automation rule 112 may be disassociated from the first network addressable power socket and associated with the second network addressable power socket.

In another example, an automation rule 112 may be assigned to a network addressable power socket 122. For example, an automation rule 112 may specify that a network addressable power socket 122 supply power to a connected electrical device 126 during a specified time of the day as part of a room profile (e.g., lighting a room during evening hours) subject to a condition that the electrical device 126 is a lighting device as determined by a device profile. As such, regardless of the lighting device connected to the network addressable power socket 122, the automation rule 112 may be executed.

In another example, an automation rule 112 may be associated with a group of network addressable power sockets 122 and/or with a group of electrical devices 126. For example, an automation rule 112 may be used to create a profile for a location (e.g., room, building, outdoor space, etc.) that includes multiple network addressable power sockets 122 and electrical devices 126. As an illustration, an automation rule 112 specifying a mood lighting scheme for a room may be associated with a group of network addressable power sockets 122 and/or lighting devices located in a room.

The automation service 116 may be configured, in one example, to receive messages sent from a network addressable power socket 122 via a network 120 that includes a device identifier for the power socket 122 and a tag identifier for a tag 128 attached or integrated into an electrical plug 124 of an electrical device 126. A device identifier included in a message may be used to identify a network addressable power socket 122 that sent a message to the automation service 116, and a tag identifier may be used to identify an electrical device 126 associated with the tag identifier. More specifically, the device identifier may be used to identify a power socket profile for the network addressable power socket 122. The power socket profile may contain information for the power socket 122 that includes a device identifier, a physical location of the power socket 122, socket functionality, a customer account, and one or more automation rules 112 for the network addressable power socket 122. Likewise the tag identifier may be used to identify an electrical device profile for the electrical device 126 that includes details for the electrical device 126, like a tag identifier, electrical device characteristics or functions, a customer account, and one or more automation rules 112 associated with the electrical device 126.

In receiving a message from a network addressable power socket 122 that includes a device identifier for a network addressable power socket 122 and a tag identifier assigned to an electrical device 126, the automation service 116, in one example, may be configured to retrieve an automation rule(s) 112 associated with the tag identifier and apply the automation rule(s) 112 to the network addressable power socket 122. For example, the automation service 116 may be used to update a power socket profile stored in the computing environment for the network addressable power socket 122 to include an automation rule, or a reference to the automation rule 112, associated with the tag identifier assigned to the electrical device 126.

In another example, a characteristic of an electrical device 126 may be mapped to an automation rule 112 so that the automation rule 112 may be identified and applied to a network addressable power socket 122 that is connected to an electrical device 126 having the characteristic. For example, an electrical device profile for an electrical device 126 may include electrical device characteristics for the electrical device 126. The characteristics of the electrical device 126 may be obtained from the electrical device profile and the characteristics may be used to identify an automation rule 112 that maps to the characteristic and a network addressable power socket 122 to which the electrical device 126 may be connected. As a specific example, an electrical device profile may indicate that an electrical device 126 is a coffee maker. As a result, an automation rule 112 associated with coffee makers and the network addressable power socket 122 may be identified and the automation rule 112 may be applied to the network addressable power socket 122 that the coffee maker is connected to.

In another example, a characteristic of a network addressable power socket 122 may be mapped to an automation rule 112 and the automation rule 112 may be applied to a network addressable power socket 122 having the characteristic. As an example, a location of a network addressable power socket 122 may be one characteristic that may be mapped to an automation rule 112 associated with an electrical device 126. Other characteristics of the network addressable power socket 122 may be voltage, current, control logic, wireless protocols, etc. In the event that the electrical device 126 is connected to a network addressable power socket 122, a power socket profile for the network addressable power socket 122 may be identified and a location of the network addressable power socket 122 may be ascertained. If the location corresponds with the location mapped to the automation rule 112, the automation rule may be applied to the network addressable power socket 122.

After applying an automation rule 112 to a network addressable power socket 122 (e.g., updating a power socket profile with one or more automation rules 112), the automation service 116 may execute the automation rule 112 for the network addressable power socket 122, thereby controlling the electrical device 126 via the network addressable power socket 122. A network addressable device, like a network addressable power socket 122, may be constructed to include minimal processing capabilities. Therefore, rather than execute an automation rule 112 on the network addressable power socket 122, an automation rule 112 may be executed on behalf of the network addressable power socket 122 in the computing environment 110 and instructions that result from the execution of the automation rule 112 (e.g., power-on, power-off, one or two byte commands, etc.) may be sent to the network addressable power socket 122 via the network 120. In other examples, an automation rule 112 may be sent to a network addressable power socket 122 having the capability (e.g., processing and memory) to execute the automation rule autonomously.

In the event that an electrical plug 124 for an electrical device 126 is disconnected from the network addressable power socket 122, the network addressable power socket 122 may be configured to send a message to the automation service 116 indicating that the electrical device 126 has been disconnected from the network addressable power socket 122. In response to the message, the automation service 116 may stop executing the automation rule 112 applied to the network addressable power socket 122 and, in some examples, the power socket profile for the network addressable power socket 122 may be updated to remove the automation rule 112 from the power socket profile.

As a non-limiting example of the technology, connecting an electrical plug 124 of an electrical device 126 to a network addressable power socket 122 may result in a tag identifier encoded in a NFC tag 128 located on the electrical plug 124 being read by a NFC reader 130 included in the network addressable power socket 122. Using a wireless radio or a power-line adapter integrated into the network addressable power socket 122, a message containing the tag identifier for the electrical device 126 and a power socket identifier for the network addressable power socket may be sent to the automation service 116 via the network 120 and the gateway 118.

In receiving the message, the automation service 116 may be configured to retrieve a power socket profile for the network addressable power socket 122 using the power socket identifier and a NFC tag profile using the tag identifier. In one example, an automation rule 112 for the electrical device 126 may be retrieved from the NFC tag profile and the automation rule 112 may be applied to the network addressable power socket 122 by updating the power socket profile with the automation rule 112. The automation rule 112 may then be executed by the automation service 116. For example, in executing the automation rule 112, the automation service 116 may control the electrical device 126 by sending commands to the network addressable power socket 122 that instruct the network addressable power socket 122 to perform an action, such as to power-on to a specified power level, or power-off.

In the case that the electrical plug 124 is removed from the network addressable power socket 122, the NFC reader 130 may detect that the NFC tag 128 is no longer readable and a message may be sent from the network addressable power socket 122 to the automation service 116 informing the automation service 116 that the electrical device 126 is no longer connected to the network addressable power socket 122. The automation service 116 may respond by disassociating the automation rule 112 from the network addressable power socket 122.

Figure 2:
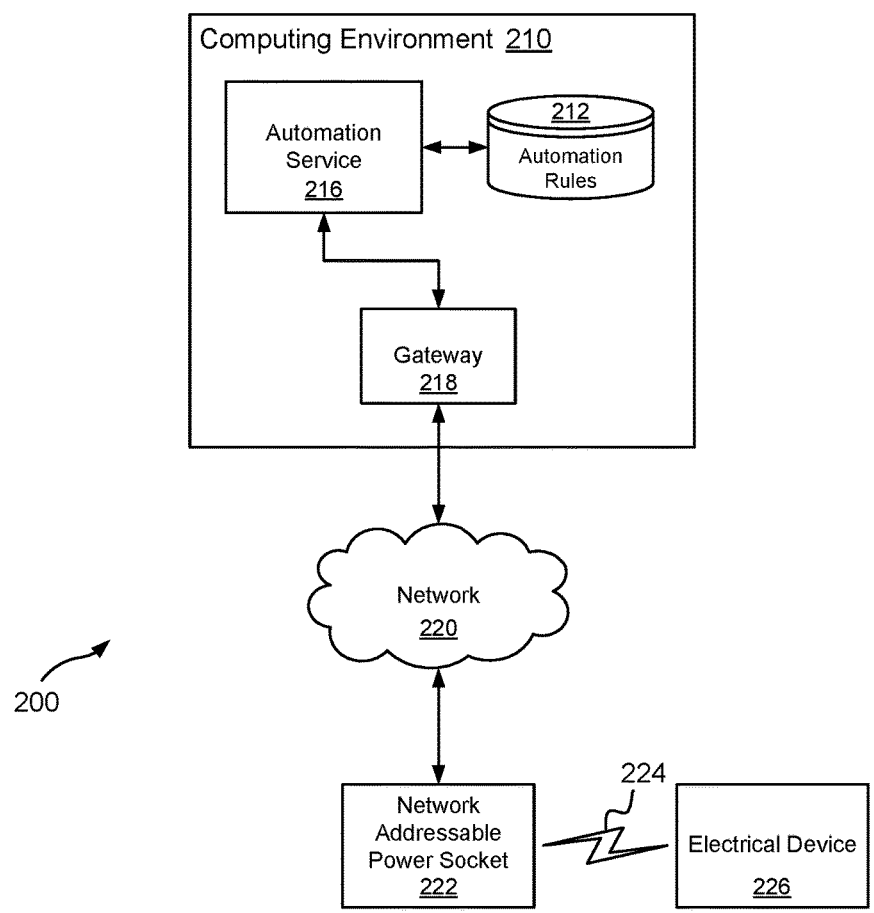
FIG. 2 is a block diagram that illustrates an example system for identifying and applying an automation rule associated with an electrical device located within proximity of a network addressable power socket.

FIG. 2 is a block diagram that illustrates an example system 200 that may be used to identify an electrical device 226 located within proximity of a network addressable power socket 222 and identify an automation rule associated with the electrical device 226 that may be applied to the network addressable power socket 222. As illustrated, the network addressable power socket 222 may be in communication with a computing environment 210 via a network 220 and a gateway 218 as described earlier.

In one example, an electrical device 226 may be discoverable by a network addressable power socket 222 via a short-range network 224 used to transmit an electrical device identifier for the electrical device 226 to the network addressable power socket 222. Illustratively, the electrical device identifier assigned to the electrical device 226 may comprise, for example, a UUID (Universally unique identifier), a serial number, random number, name, code, or the like. The electrical device 226 may include a short-range network radio that may be used to transmit the electrical device identifier to the network addressable power socket 222 that may be within range of radio transmissions generated by the electrical device's short-range network radio. The network addressable power socket 222 may include a short-range network receiver that receives the radio transmissions generated by the short-range network radio. Examples of short-range network protocols that may be used include BLUETOOTH, BLE (BLUETOOTH Low Energy), ZIGBEE, as well as other communication protocols used to create personal area networks with small, low-power radios.

After discovery of the electrical device 226 by the network addressable power socket 222 via the short-range network 224, the network addressable power socket 222 may be configured to send a message that includes the electrical device identifier for the electrical device 226 and a power socket identifier for the network addressable power socket 222 to the automation service 216. In response to receiving the message, the automation service 216 may be configured to use the electrical device identifier to identify an automation rule 212 assigned to the electrical device 226.

In one example, the electrical device 226 may be registered with the automation service 216 and an automation rule 212 may be assigned to the electrical device 226. For example, an electrical device profile may be created for the electrical device 226 and the electrical device identifier assigned to the electrical device 226 may be used to identify the electrical device profile. After registering the electrical device 226 with the automation service 216 one or more automation rules 212 may be assigned to the electrical device 226. For example, an automation rule 212 may be assigned to the electrical device by including the automation rule 212 in the electrical device profile for the electrical device 226. After the electrical device 226 is discovered by the network addressable power socket 222, the electrical device identifier for the electrical device 226 may be sent to the automation service 216, which then obtains an automation rule 212 assigned to the electrical device 226 from the electrical device profile for the electrical device 226 using the electrical device identifier. The automation service 216 may then manage the electrical device 226 via the automation rule 212.

As a non-limiting illustration, after connecting an electrical plug for the electrical device 226 to the network addressable power socket 222, or powering on the electrical device 226 via a battery, the electrical device 226 may transmit the electrical device identifier via the short-range network 224 to the network addressable power socket 222. The network addressable power socket 222 may detect the transmission of the electrical device identifier and send a message to the automation service 216 indicating that the electrical device 226 has been detected by the network addressable power socket 222.

The automation service 216 may receive the message sent by the network addressable power socket 222 and an association may be formed between the network addressable power socket 222 and the electrical device 226. For example, a power socket profile for the network addressable power socket 222 may be updated to indicate that the electrical device 226 is connected to the network addressable power socket 222. In one example, a determination may be made that the electrical device 226 is not associated (connected) with any other network addressable power sockets 222 that may be within range of the electrical device 226. An automation rule 212 assigned to the electrical device 226 may be identified and the automation rule 212 may be applied to the network addressable power socket 222, resulting in the electrical device 226 being controlled via the automation rule 212 executed by the automation service 216 and the network addressable power socket 222.

In some examples, a network addressable power socket 222 may be included in a group profile that includes a plurality of network addressable power socket, and may include other types of network addressable devices. A group profile may be used to define the behavior of devices included in the group profile. For example, a group profile may be defined for a room and may specify when lighting devices in the room turn on, dim, and turn off In the event that an electrical device 226 is connected to a network addressable power socket 222, or in proximity of the network addressable power socket 222 that is included in a group profile, a determination may be made whether the characteristics of electrical device 226 may be compatible with the group profile. For example, if the group profile applies to lighting devices, the characteristics of the electrical device 226 may be evaluated to determine whether the electrical device 226 is a lighting device. In the case that the electrical device 226 is a lighting device, the group profile may be applied to the network addressable power socket 222, otherwise the group profile will not be applied.

In an example where the electrical device 226 may include sensors, the electrical device 226 may transmit sensor data produced by the sensors to the network addressable power socket 222 using the short-range network 224. For example, the electrical device 226 may be a low-power device configured with a short-range radio. Data generated by a sensor in the electrical device 226 (e.g., a motion sensing device, an air quality monitor, keypad, etc.) may be sent using the short-range radio to the network addressable power socket 222, which may then send the data to a network service (not shown) included in the computing environment 210.

Figure 3:
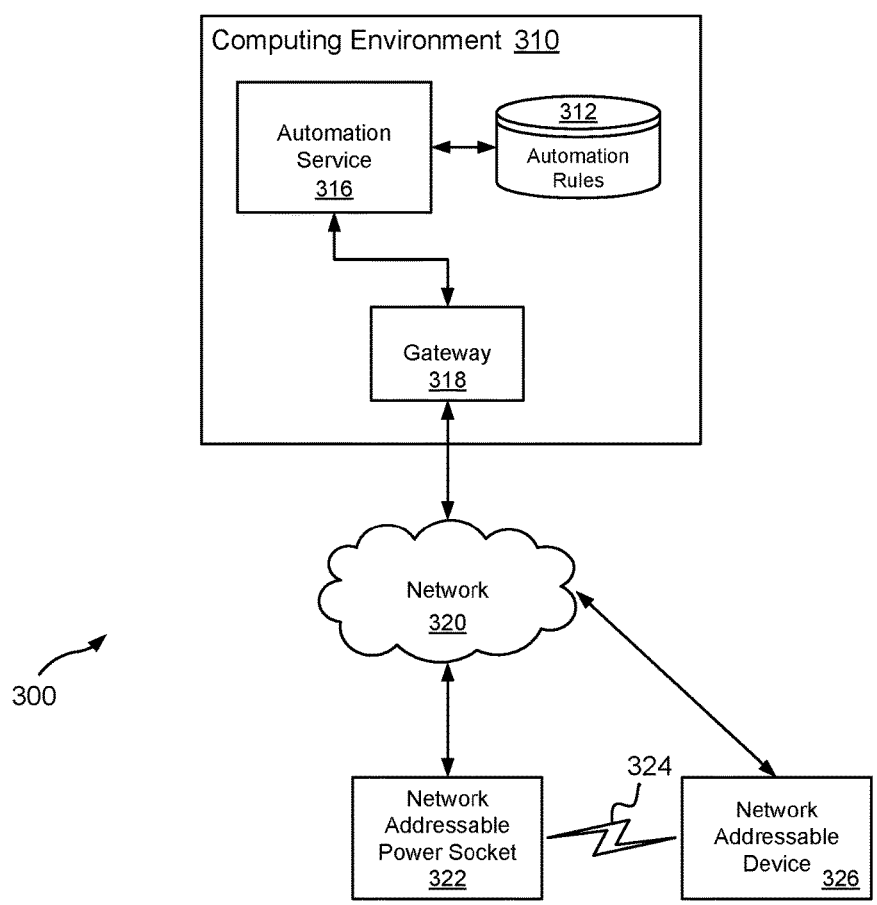
FIG. 3 is a block diagram illustrating an example system for identifying and applying an automation rule according to the proximity of a network addressable device to a network addressable power socket.

FIG. 3 is a block diagram that illustrates an example system 300 for identifying an automation rule 312 to apply to a network addressable device 326 or to a network addressable power socket 322 according to the proximity of the network addressable device 326 to the network addressable power socket 322. As illustrated, the network addressable device 326 and the network addressable power socket 322 may be in communication with a computing environment 310 via a network 320 and a gateway 318.

The network addressable device 326 and the network addressable power socket 322 may be configured with short-range network radios that allow the network addressable device 326 and the network addressable power socket 322 to communicate over a short-range network 324. In one example, the network addressable power socket 322 may be configured to operate the short-range network radio in an advertisement mode that notifies nearby network addressable devices 322 of the network addressable power socket's presence. For example, the network addressable power socket 322 may advertise a power socket identifier that may be detectable by the network addressable device 326. In the event that the network addressable device 326 detects the presence of the network addressable power socket 322, the network addressable device 326 may be configured to send the power socket identifier for the network addressable power socket 322 along with a device identifier for the network addressable device 326 to an automation service 316 in the computing environment 310.

In another example, the network addressable power socket 322 may be configured to operate in an advertisement mode, thereby notifying nearby network addressable devices 326 of the network addressable power socket's presence. The network addressable device 326 may transmit a device identifier for the network addressable device 326 to the network addressable power socket 322 via the short-range network 324. In the event that the network addressable power socket 322 detects the presence of the network addressable device 326, the network addressable power socket 322 may be configured to send the device identifier and the power socket identifier for the network addressable power socket 322 to the automation service 316.

In response to receiving a power socket identifier and a device identifier, the automation service 316 may identify an automation rule 312 associated with the power socket identifier and the device identifier. In one example, the automation rule 312 may be defined for a network addressable device 326 and a network addressable power socket 322, such that when the network addressable device 326 is in proximity to the network addressable power socket 322, the automation rule 312 may be applied. For example, the automation rule 312 may specify a functionality of the network addressable device 326, data used by the network addressable device 326, and/or data served to the network addressable device 326 when the network addressable device is in proximity to the network addressable power socket 322. As a specific example, an automation rule 312 may be defined for a network addressable audio speaker that specifies a music playlist that is streamed to the speaker when the speaker is within a range of the network addressable power socket 322. For example, an automation rule 312 specifying a particular playlist may be defined for each room in a building that contains a network addressable power socket 322. As such, moving the speaker from one room to another room results in applying the automation rule 312 defined for the room and streaming a playlist for the room.

In another example, the automation rule 312 may be defined for the network addressable power socket 322 for when the network addressable device 326 is in proximity of the network addressable power socket 322. Again using the example of the network addressable audio speaker, the speaker may be connected (plugged-in) to the network addressable power socket 322. An automation rule 312 may be defined for the network addressable power socket 322 specifying that power to the speaker be controlled according to one or more conditions (e.g., time of day, room occupancy, etc.) specified in the automation rule 312.

After identifying an automation rule 312 associated with a power socket identifier and a device identifier, the automation rule 312 may be applied to either the network addressable device 326 or the network addressable power socket 322 depending upon which device the automation rule 312 may be assigned to. In the event that either the network addressable device 326 or the network addressable power socket 322 may no longer be detectable to one another, the automation service 316 may inactivate the automation rule 312.

Figure 4:
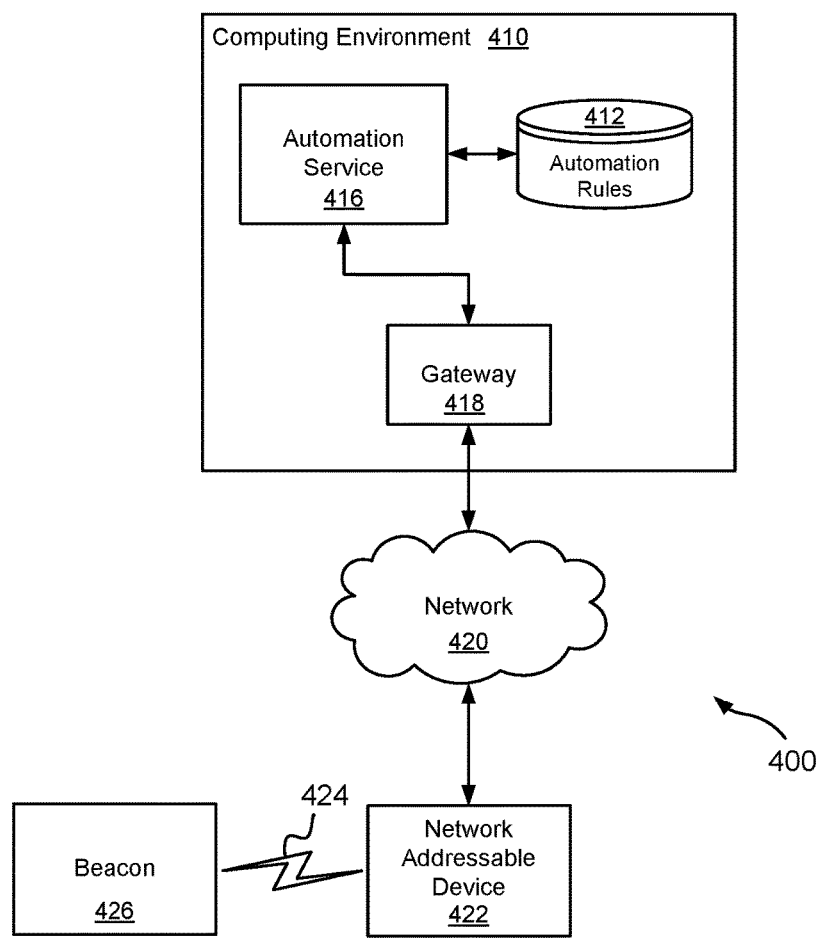
FIG. 4 is a block diagram that illustrates an example system for identifying an automation rule to apply to a network addressable device according to the proximity of the network addressable device to a beacon.

FIG. 4 is a block diagram that illustrates an example system 400 for identifying an automation rule 412 that may be applied to a network addressable device 422 according to the proximity of the network addressable device 422 to a beacon 426. A beacon 426 may be computing hardware (e.g., a small coin cell device, USB stick, USB dongle, or similar device) configured to transmit a beacon identifier and other information to surrounding network addressable devices 422. For example, a beacon 426 may transmit a beacon identifier (e.g., a UUID) using a low energy short-range network protocol (e.g., BLE). A beacon 426 may be placed at various locations indoors and/or outdoors, or may be made mobile by placing the beacon 426 on a vehicle or a person.

As illustrated, the network addressable device 422 may be in communication with an automation service 416 included in a computing environment 410 via a network 420 and a gateway 418. The automation service 416 may be a network service that manages the functionality of the network addressable device 422 via automation rules 412 that may be determined based in part on the proximity of the network addressable device to the beacon 426. For example, in the event that the network addressable device 422 comes within the proximity of a radio signal transmitted by the beacon 426, the network addressable device 422 may be configured to detect the radio signal and send the beacon identifier for the beacon 426 to an automation service 416 configured to identify an automation rule 412 associated with the beacon 426, or a location of the beacon 426, and apply the automation rule 412 to the network addressable device 422.

In one example, the network addressable device 422 may be a multi-functional device (e.g., a computing device) that performs a particular function determined in part by an automation rule 412. For example, the network addressable device 422 may be capable of executing software applications that are determined in part by an automation rule 412. As a specific example, the network addressable device 422 may execute a warehouse shipping application when in proximity of a first beacon located in a warehouse shipping department and the network addressable device 422 may execute a warehouse receiving application when in proximity to a second beacon located in warehouse receiving department.

In another example, the network addressable device 422 may be a static function device (e.g., a display, audio device, input device, sensor, etc.) that sends data to a network service executing in the computing environment 410. The network service that receives the data may be determined in part by an automation rule 412. For example, a scanner (e.g., scan gun) may be one type of network addressable device 422 that transmits data to a network service that executes within the computing environment 410. When the scanner is in proximity of a first beacon, an automation rule 412 associated with the first beacon may specify that data sent by the scanner be routed to a product inventory network service (not shown). When the scanner is in proximity to a second beacon, an automation rule 412 associated with a second beacon may specify that data sent by the scanner to the computing environment 410 be routed to an order processing network service (not shown).

A network addressable device 422 may be registered with the computing service environment 410 and a device profile may be created for the network addressable device 422. The device profile may contain device details that include, for example, a device identifier, device attributes, an associated customer account, as well as other device details. Also, a beacon 426 may be registered with the computing service environment 410 and a beacon profile may be created for the beacon 426 that contains beacon details such as, a beacon identifier and beacon attributes (e.g., latitude and longitude coordinates, indoor floor level, and/or a location identifier). The network addressable device 422 and the beacon 426 may be registered using the device registry 742 shown in FIG. 7. Automation rules 412 and/or function profiles that may be applied to a network addressable device 422 when the network addressable device 422 is in proximity to a beacon 426 may be defined for the network addressable device 422 and registered with the automation service 416.

As indicated above, the automation service 416 may manage the functionality of a network addressable device 422 using automation rules 412. In one example, the automation service 416 may be configured to receive from a network addressable device 422 a beacon identifier for a beacon 426 that is within proximity of the network addressable device 422 and a device identifier for the network addressable device 422. An automation rule 412 defining the functionality of the network addressable device 422 may be identified using the device identifier and the beacon identifier.

Various methods may be used for storing and retrieving automation rules 412. In one example, an automation rule 412 may be associated with a device identifier and a beacon identifier in a data store record. The automation service 416 may be configured to retrieve the automation rule 412 from the data store record by querying the data store using the device identifier and the beacon identifier.

In another example, an automation rule 412 may be included in a device profile for the network addressable device 422. The automation rule 412 may be associated with a particular beacon 426 using a beacon identifier. The automation service 416 may be configured to identify the device profile for the network addressable device 422 using a device identifier provided by the network addressable device 422 and retrieve the automation rule 412 from the device profile using the beacon identifier.

In another example, an automation rule 412 may be included in a beacon profile for the beacon 426. The automation rule 412 may be applied to the network addressable device 422 when in proximity to the beacon 426. The automation service 416 may be configured to identify the beacon profile for the beacon using a beacon identifier provided by the network addressable device 422 and retrieve the automation rule 412 from the beacon profile using the beacon identifier.

In yet another example, a function profile defining the functional behavior of a network addressable device 422 when in proximity to a beacon 426 may be identified and the functional profile may be applied to the network addressable device 422. For example, a functional profile may specify actions that the network addressable device 422 may perform or may specify how data received from the network addressable device 422 may be handled. As one specific example, a function profile may specify that a network addressable kiosk located in a retail store perform price checking when in proximity of a beacon 426. As another specific example, a function profile may specify that a network addressable video display receive a video advertisement for a particular product when in proximity of a beacon 426.

In some examples, a device type for a network addressable device 422 may be used to identify an automation rule 412 that corresponds to the device type of the network addressable device 422 and a beacon 426 associated with the automation rule 412. As a specific example, an automation rule 412 may be defined for network addressable video displays and a beacon 426 that display a video specified by the automation rule 412. When a video display is in proximity to the beacon 426, the automation service 416 may be configured to identify a device type for the video display (e.g., using a device profile for the video display) and identify the automation rule 412 (e.g., using a beacon identifier for the beacon 426) for the beacon 426 so that the automation rule 412 may be applied to the network addressable device 422.

After an automation rule 412 has been identified and retrieved, the automation rule 412 may be applied to the network addressable device 422. In one example, the automation service 416 may execute the automation rule 412 on behalf of the network addressable device 422, sending commands to the network addressable device 422 according to various inputs and/or conditions. In another example, the automation rule 412 may be sent to the network addressable device 422 for execution on the network addressable device 422. As such, the network addressable device 422 may perform various actions in response to inputs and/or conditions that may come from a network service in the computing environment 410 or a local environment according to the automation rule 412. In one example, an automation rule 412 sent to a network addressable device 422 may include connection credentials that enable the network addressable device 422 to communicate with a particular network service. For example, the automation rule 412 may include a network address or an API (Application Programming Interface) that may be used by the network addressable device 422 to connect to the network service.

Figure 5:
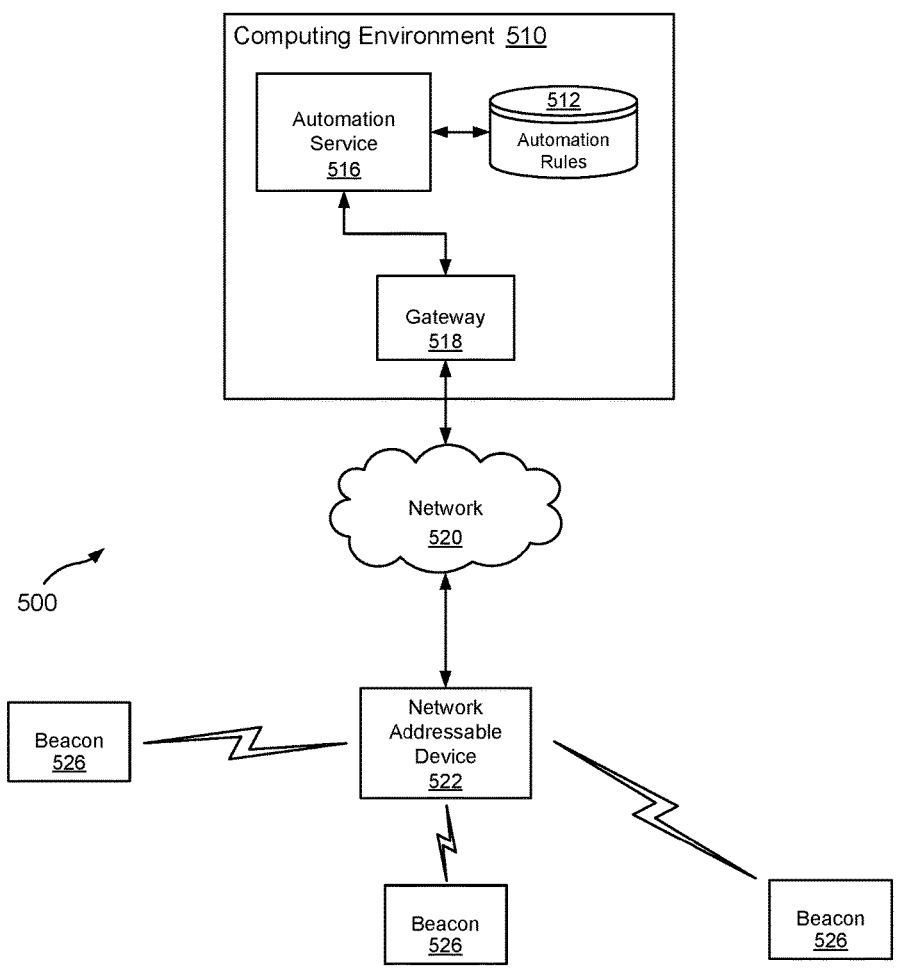
FIG. 5 is a block diagram illustrating an example system for identifying an automation rule to apply to a network addressable device according to a proximity range of the network addressable device to a plurality of beacons.

FIG. 5 is a block diagram that illustrates an example system 500 for identifying an automation rule 512 to apply to a network addressable device 522 according to a proximity range of the network addressable device 522 to a beacon 526a as compared to the proximity range of other beacons 526 to the network addressable device 522. A proximity range of a beacon 526 to a network addressable device 522 may be calculated by the network addressable device 522. For example, a ranging function returns a list of beacons 526 in range of the network addressable device 522 along with an estimated distance of the network addressable device 522 to the beacons 526. For example, a network addressable device 422 may receive a transmission from a beacon 526 that includes a UUID for the beacon 526 and execute a ranging function to approximate the distance of the network addressable device 522 from the beacon 526. In some examples, a proximity range may be categorized into: immediate (e.g., within a few centimeters), near: (within a couple of meters), and far (e.g., greater than 10 meters).

In one example, a network addressable device 522 may provide a list of beacons 526 and proximity ranges to the beacons 526 to an automation service 516 via a network 520 and gateway 518. In receiving the list of beacons and proximity ranges, the automation service 516 may be configured to identify an automation rule 512 to apply to the network addressable device 522. In one example, an automation rule 512 may be identified based in part on the proximity of the network addressable device 522 to a beacon 526.

As one example, an automation rule 512 associated with a beacon 526 having a proximity range that may be closer (e.g., immediate) to the network addressable device 522 as compared to a proximity range of the other beacons may be selected and applied to the network addressable device 522. As another example, an automation rule 512 may be applied to the network addressable device 522 as a result of the network addressable device 522 being within a specified proximity range (e.g., near) to a beacon 526 even though another beacon 526 may be closer in proximity (immediate) to the network addressable device 522.

In the event that the network addressable device 522 moves outside of a specified proximity range, the automation service 516 may receive notice that the network addressable device 522 may no longer be within the specified proximity range of the beacon 526. As such, an automation rule 512 associated with the beacon 526 may be disassociated from the network addressable device 522. As will be appreciated, a number of scenarios involving automation rules 512 and proximity ranges of a network addressable device 522 to a plurality of beacons 526 may be contemplated and these scenarios are within the scope of this disclosure.

FIG. 6 illustrates components of an example system 600 on which the present technology may be executed. The system 600 may include a computing environment 602 that includes a server computer 604 that may be in communication with network addressable devices 632 via a network 630. A network addressable device 632 may be a network addressable power socket as described earlier, or may be another type of network addressable device. The server computer 604 may execute an automation service 614. In one example, the automation service 614 may include a rule identification module 606, a rule execution module 608, a device state module 610, and an automation rule user interface 612.

The rule identification module 606 may be configured to identify one or more automation rules 620 associated with a network addressable device 632, an electrical device 636 and/or a beacon 634 in response to receiving a message from the network addressable device 632. The message may include identity data for the network addressable device 632, the electrical device 636 and/or the beacon 634. In one example, the identity data may include a device identifier or a power socket identifier for a network addressable device 632, a tag identifier for an electrical device 636, and/or a beacon identifier for a beacon 634. The identity data may be used to identify device profiles 618 (e.g., a network addressable device profile, an electrical device profile, or a beacon profile) associated with the identity data and one or more automation rules 620 associated with the identity data. For example, a device profile 618 for a network addressable device 632, beacon 634, and/or an electrical device 636 identified using identity data may include a reference to an automation rule 620 that may be applied to a network addressable device 632. An automation rule 620 identified using the identity data may be provided to the rule execution module 608 or may be provided to a network addressable device 632.

The rule execution module 608 may be configured to execute an automation rule 620 on behalf of a network addressable device 632 or electrical device 636. In executing an automation rule 620, the rule execution module 608 may send commands based on conditional logic or inputs to a network addressable device 632. As an illustration, power-on and power-off commands may be sent to a network addressable power socket based on inputs received from a user or conditional logic related to a room lighting profile. In another example, execution of an automation rule 620 may determine a functional behavior of a network addressable device 632 as a result of being in proximity of a beacon 634. For example, a network addressable device 632 may function as an interactive store directory when in proximity to a first beacon and may function as a product video display when in proximity of a second beacon.

The device state module 610 may be configured to track the state of a network addressable device 632 using state information 622. State information 622 may include information for automation rules 620 that are currently applied to a network addressable device 632, an occupied state of a network addressable device 632, a proximity state of a network addressable device 632 to beacons 634, as well as other state information 622.

As one example, the device state module 610 may be used to track an occupied state of a network addressable power socket and the occupied state may be used to determine whether an electrical device 636 is connected to the network addressable power socket. When the occupied state indicates that an electrical device 636 is connected to the network addressable power socket, an automation rule 620 associated with the electrical device 636 may be activated, and when the occupied state indicates that the electrical device 636 is not connected, the automation rule 620 may be deactivated.

In another example, the device state module 610 may be used to track beacons 634 that are within proximity of a network addressable device 632. For example, state information 622 that includes UUID's for beacons 634 and an estimated distance of the beacons 634 to a network addressable device 632 may be used to track the network addressable device 632. The state information 622 may be used in determining an automation rule 620 to apply to the network addressable device 632.

The automation rule user interface 612 may allow users to interface with the automation service 614 to create, manage, and/or delete automation rules 620. In one example, an API (Application Programming Interface) may be used in providing the automation rule user interface 612.

Network addressable devices 632 may be configured to communicate with services executed within the computing environment 602, and the services in return may communicate with the network addressable devices via the network 630. Electrical device 636, in some examples, may be able to communicate with a network addressable device (e.g., via an NFC tag or short-range network), but may not have the ability to communicate over the network 630. The network addressable device 632 and electrical devices 636 may be configured with minimal, very limited, or no computing capabilities.

The various processes and/or other functionality contained within the system 600 may be executed on one or more processors 626 that are in communication with one or more memory modules 628. The system 600 may include a number of computing devices that are arranged, for example, in one or more server banks or computer banks or other arrangements. The computing devices may support a computing environment using hypervisors, virtual machine monitors (VMMs) and other virtualization software. A data store 616 may store data utilized by the automation service 614 that includes device profiles 618, automation rules 620, state information 622 and other data. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store 616 may include storage systems such as a SAN (Storage Area Network), cloud storage network, volatile or non-volatile RAM, optical media, or hard-drive type media. The data store 616 may be representative of a plurality of data stores as can be appreciated.

The network 630 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 6 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 6 illustrates an example of a system that may implement the techniques above, many other similar or different environments are possible. The example environments discussed and illustrated above are merely representative and not limiting.

Figure 7:
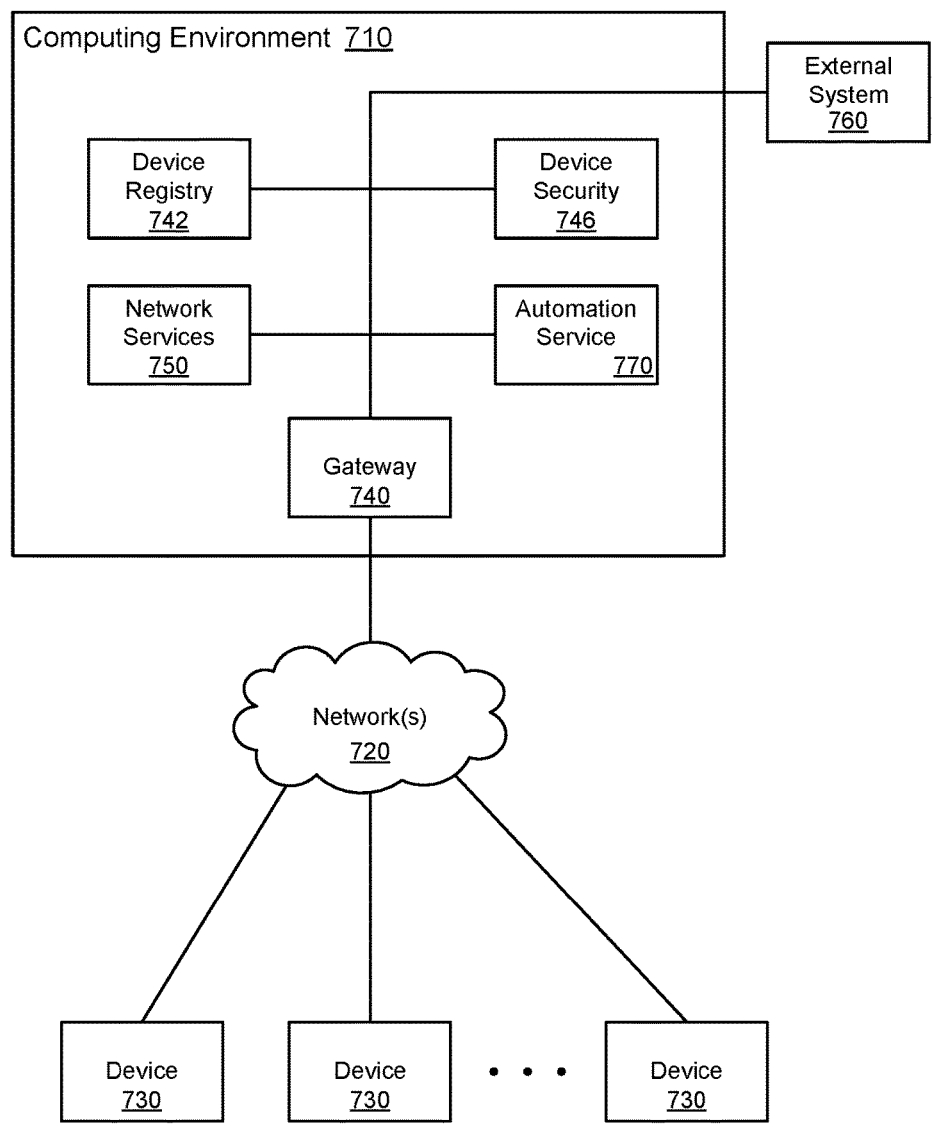
FIG. 7 is a block diagram illustrating an example computer networking architecture for providing network addressable devices access to network services.

FIG. 7 is a diagram illustrating an example computing environment 710 with which network addressable devices 730 may communicate. The computing environment 710, which may be referred to as a device communication environment or system, comprises various resources that are made accessible via gateway server 740 to the devices 730 that access the gateway server 740 via a network 720. The devices 730 may access the computing environment 710 in order to access services such as data storage and computing processing features. Services operating in the computing environment 710 may communicate data and messages to the devices 730 in response to requests from devices and/or in response to computing operations within the services.

The computing environment 710 comprises communicatively coupled component systems 740, 742, 746, 750 and 770 that operate to provide services to the devices 730. The gateway server 740 may be programmed to provide an interface between the devices 730 and the computing environment 710. The gateway server 740 receives requests from the devices 730 and forwards corresponding data and messages to the appropriate systems within the computing environment 710. Likewise, when systems within the computing environment 710 attempt to communicate data instructions to the devices 730, the gateway server 740 routes those requests to the correct device 730.

The gateway server 740 may be adapted to communicate with varied devices 730 using various different computing and communication capabilities. For example, the gateway server 740 may be adapted to communicate using either TCP (Transmission Control Protocol) or UDP (User Datagram Protocol) protocols. Likewise, the gateway server 740 may be programmed to receive and communicate with the devices 730 using any suitable protocol including, for example, MQTT (Message Queue Telemetry Transport), CoAP (Constrained Application Protocol), HTTP (Hyper Text Transport Protocol), and HTTPS (Hyper Text Transport Protocol Secure). The gateway server 740 may be programmed to convert the data and instructions or messages received from the devices 730 into a format that may be used by other of the server systems comprised in the computing environment 710. In one example, the gateway server 740 may be adapted to convert a message received using the HTTPS protocol into a JSON (JavaScript Object Notation) formatted message that is suitable for communication to other servers within the computing environment 710.

The gateway server 740 may store, or may control the storing, of information regarding the devices 730 that have formed a connection to the particular gateway server 740 and for which the particular gateway server 740 may be generally relied upon for communications with the device 730. In one example, the gateway server 740 may have stored thereon information specifying the particular device 730 such as a device identifier. For each connection established from the particular device 730, the gateway server 740 may also maintain information identifying the connection. For example, a connection identifier may be generated and stored for each connection established with a particular device 730. Information relating to the particular connection may also be stored. For example, information identifying the particular socket of the gateway server 740 on which the connection was established, as well as information identifying the particular protocol used by the device 730 on the connection may be stored by the gateway server 740. Information such as the socket and protocol may be used in order to facilitate further communications via the particular connection.

In one example, the gateway server 740 may communicate via any suitable networking technology with a device registry server 742. The device registry server 742 may be adapted to track the attributes and capabilities of each device 730. In an example, the device registry sever 742 may be provisioned with information specifying the attributes of the devices 730. For instance, a device 730 may be registered with the device registry by providing a device identifier and a device type for a device. In some examples, a beacon device may be registered with the device registry 742 by providing a beacon identifier and beacon attributes for the beacon device. Beacon attributes may include latitude and longitude coordinates, indoor floor level, and a location identifier.

The automation service server 770 may comprise data specifying rules or logic (e.g., automation rules) for handling various requests that may be received from the devices 730. The automation service server 770 may be programmed to convert specialized device functions or commands received in particular communication protocols such as, for example HTTPS, MQTT, CoAP, into functions or commands using particular protocols that are understood by other of the servers in the computing environment 710. In one example, the automation service server 770 may be provisioned with information specifying that upon receipt of a particular request from a particular device 730, a request should be made to store the payload data of the request in a particular network service server 750. The automation service server 770 may be similarly programmed to receive requests from servers 742, 750 and convert those requests into commands and protocols understood by the devices 730.

The device security server 746 maintains security-related information for the devices 730 that connect to the computing environment 710. In one example, the device security server 746 may be programmed to process requests to register devices with the computing environment 710. For example, entities such as device manufacturers, may forward requests to register devices 730 with the computing environment 710. The device security server 746 receives registration requests and assigns unique device identifiers to devices 730 which use the device identifiers on subsequent requests to access the computing environment 710. The device security server 746 stores, for each registered device, authentication information that may be provided during the device registration process. For example, a request to register a device 730 may comprise information identifying the device 730 such as a device serial number and information for use in authenticating the device 730. In one example, the information may comprise a digital certificate and may comprise a public key of a public key-private key pair. The information may be stored in relation to the assigned device identifier for the particular device 730. When the device 730 subsequently attempts to access the computing environment 710, the request may be routed to the device security server 746 for evaluation. The device security server 746 determines whether authentication information provided in the request is consistent with the authentication information stored in relation to the device identifier and provided during the registration process.

The device security server 746 may be further programmed to process request to associate particular entities (individuals or organizations) with particular devices 730. The device security server 746 may be adapted to receive requests to register entities, which may be, for example, individuals, users, accounts, and/or organizations, as authorized to control or communicate with a particular device 730. In one example, a request may be received from an individual or organization that may have purchased a device 730 from a manufacturer. For example, the device may be a dishwasher, thermostat, or lighting assembly that an individual or organization purchased from the manufacturer. The individual or organization may initiate a request to register the device 730 with the individual or an organization with which the organization is associated. The request may be routed to a web services server which may be comprised in computing environment 710 or which communicates the request to the computing environment 710. The request identifies the device 730 and the particular entity (individual or organization) that is requesting to be associated with the device 730. In one example, the request may comprise a unique device identifier that was assigned when the device 730 was registered with the system. The request further may comprise information uniquely identifying the entity that is registering as having authority to communicate with and/or control the particular device 730.

The device security server 746 stores the information identifying the particular entity in relation with the device identifier. When the particular entity subsequently attempts to control or communicate data to the particular device 730, the device security server 746 may use the information to confirm that the particular entity is authorized to communicate with or control the particular device 730. When an entity that has not been registered as being authorized to communicate with the device 730 attempts to communicate with or control the device 730, the device security server 746 may use the information stored in the device security server 746 to deny the request.

A network services server 750 may be any resource or processing server that may be used by any of servers 740, 742, 746, or 770 in processing requests from the devices 730. In one example, network services server 750 may provide data storage and retrieval services and/or on-demand processing capacity. In an example scenario, the network services server 750 may be any of numerous network accessible services including, for example, web or cloud-based services. In one example, the web services server 750 may be programmed to provide particular processing for particular devices 730 and/or groups of devices 730. For example, a network services server 750 may be provisioned with software that coordinates the operation of a particular set of devices 730 that control a particular manufacturing operation.

Servers 740, 742, 746, 750, and 770 may be communicatively coupled via any suitable networking hardware and software. For example, the servers may communicate via a local area network or wide area network.

An external system 760 may access computing environment 710 for any number of purposes. In one example, an external system 760 may be a system adapted to forward requests to register devices 730 with the computing environment 710. For example, an external system 760 may be a server operated by or for a device manufacturer that sends requests to computing environment 710, and device security server 746 in particular, to register devices 730 for operation with computing environment 710. Similarly, the external system 760 may be a system operated to provide a gateway for entities (individuals or organizations) to register an ownership or control relationship with a particular device 730.

Figure 8:
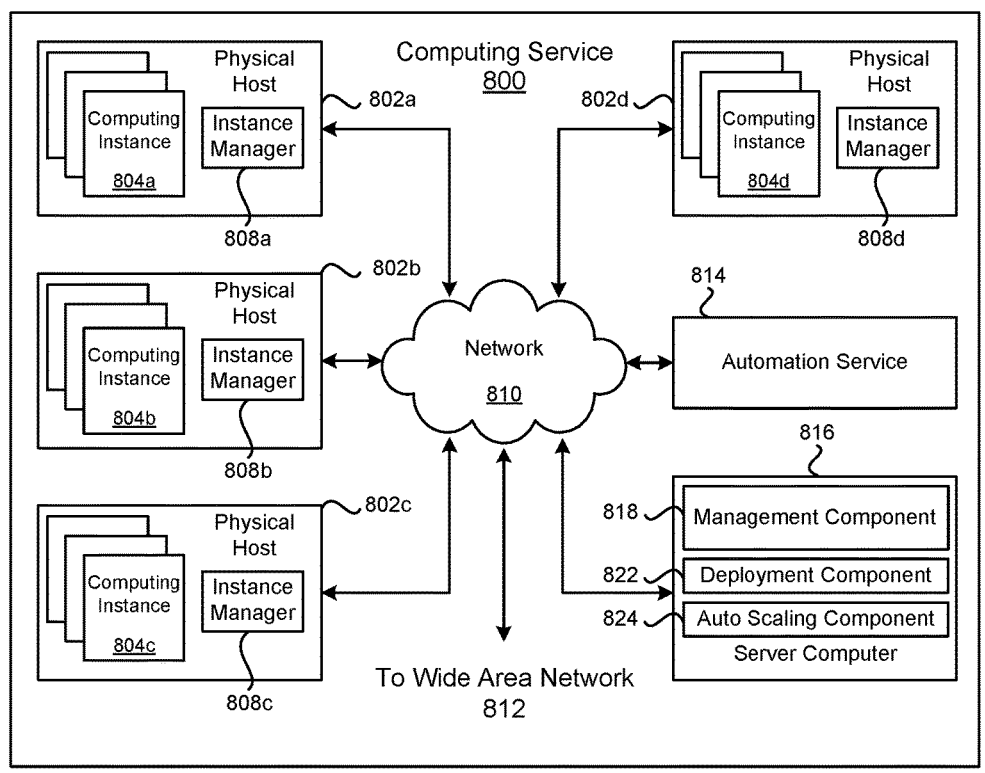
FIG. 8 is a block diagram illustrating an example computing service that may be used to execute and manage a number of computing instances that provide network services to network addressable devices.

The devices 730 may be any devices that may be communicatively coupled via a network 720 with the computing environment 710. For example, the devices 730 may be computing devices such as smart phones and tablet computers, automobiles, appliances such as washers and driers, industrial sensors, switches, control systems, etc. In one example, each of devices 730 may communicate over the network 720 to store data reflecting the operations of the particular device 730 and/or to request processing provided by, for example, network services server 750. While FIG. 8 depicts three devices 730, it will be appreciated that any number of devices 730 may access the computing environment 710 via the gateway server 740. Further it will be appreciated that the devices 730 may employ various different communication protocols. For example, some devices 730 may transport data using TCP, while others may communicate data using UDP. Some devices 730 may use MQTT, while others may use CoAP, and still others may use HTTPs. It will also be appreciated that each of devices 730 may be programmed to send and receive particular functions or commands in its requests that are not compatible with other devices or even the systems within computing environment 710. The gateway server 740 may be programmed to receive and, if needed, attend to converting such requests for processing with the computing environment 710.

FIG. 8 is a block diagram illustrating an example computing service 800 that may be used to execute and manage a number of computing instances 804a-d. In particular, the computing service 800 depicted illustrates one environment in which the technology described herein may be used. The computing service 800 may be one type of environment that includes various virtualized service resources that may be used, for instance, to host computing instances 804a-d that execute the services described in association with FIG. 7.

The particularly illustrated computing service 800 may include a plurality of server computers 802a-d. While four server computers are shown, any number may be used, and large data centers may include thousands of server computers. The computing service 800 may provide computing resources for executing computing instances 804a-d. Computing instances 804a-d may, for example, be virtual machines. A virtual machine may be an instance of a software implementation of a machine (i.e. a computer) that executes applications like a physical machine. In the example of a virtual machine, each of the server computers 802a-d may be configured to execute an instance manager 808a-d capable of executing the instances. The instance manager 808a-d may be a hypervisor, virtual machine monitor (VMM), or another type of program configured to enable the execution of multiple computing instances 804a-d on a single server. Additionally, each of the computing instances 804a-d may be configured to execute one or more applications.

One or more server computers 814 and 816 may be reserved to execute software components for managing the operation of the computing service 800 and the computing instances 804a-d. For example, the server computer 814 may execute an automation service as described earlier. The server computer 816 may execute a management component 818, a deployment component 822, and an auto scaling component 824.

An entity may access the management component 818 to configure various aspects of the operation of the computing instances 804a-d purchased by the entity. For example, an entity may setup computing instances 804a-d and make changes to the configuration of the computing instances 804a-d. The deployment component may assist entities in the deployment of new instances of computer resources.

The deployment component may receive a configuration from an entity that includes data describing how new computing instances 804a-d should be configured. For example, the configuration may specify one or more applications that should be installed in new computing instances 804a-d, provide scripts and/or other types of code to be executed for configuring new computing instances 804a-d, provide cache warming logic specifying how an application cache should be prepared, and other types of information. The deployment component may utilize the entity-provided configuration and cache warming logic to configure, prime, and launch new computing instances 804a-d. The configuration, cache warming logic, and other information may be specified by an entity using the management component or by providing this information directly to the deployment component. Other mechanisms may also be utilized to configure the operation of deployment component.

The auto scaling component may scale computing instances 804a-d based upon rules defined by an entity of a web services platform. For example, the auto scaling component may allow an entity to specify scale up rules for use in determining when new computing instances 804a-d should be instantiated and scale down rules for use in determining when existing computing instances 804a-d should be terminated.

A network 810 may be utilized to interconnect the computing service 800 and the server computers 802a-d, 816. The network 810 may be a local area network (LAN) and may be connected to a Wide Area Network (WAN) 812 or the Internet. The network topology illustrated in FIG. 8 has been simplified, many more networks and networking devices may be utilized to interconnect the various computing systems disclosed herein.

Figure 9:
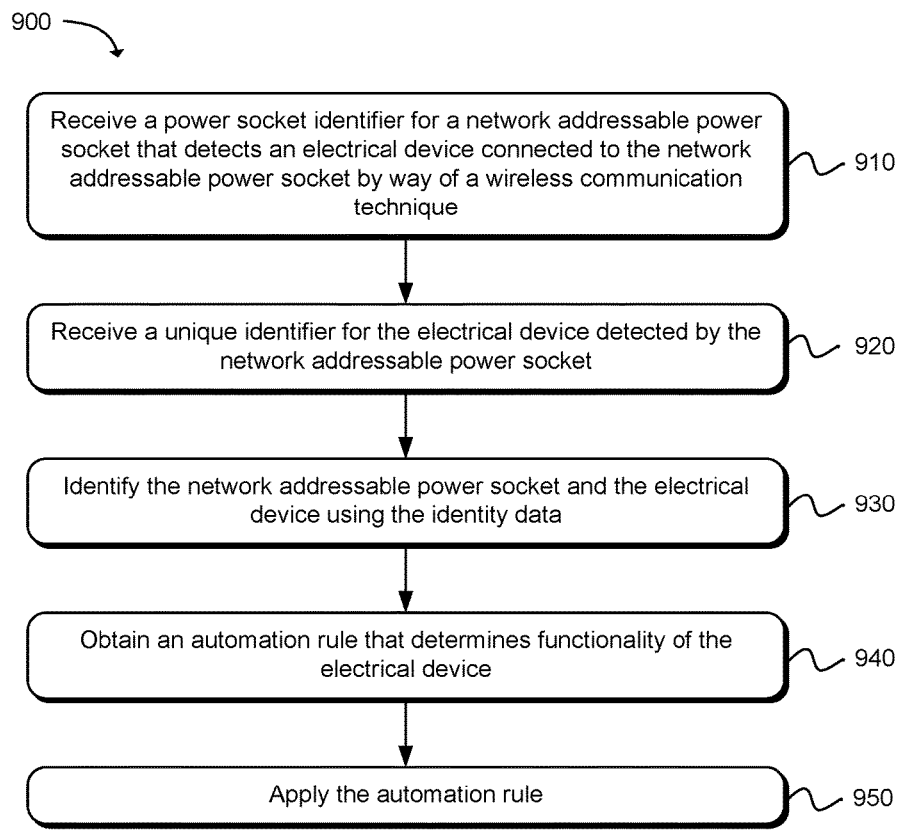
FIG. 9 is a flow diagram that illustrates an example method for identifying and applying an automation rule to either a network addressable power socket or an electrical device connected to the network addressable power socket.

Moving now to FIG. 9, a flow diagram illustrates an example method 900 for identifying and applying an automation rule to either of a network addressable power socket or an electrical device connected to the network addressable power socket. Starting in block 910, a power socket identifier may be received for a network addressable power socket via a computer network. The network addressable power socket detects an electrical device connected to the network addressable power socket using a wireless communication technique, such as NFC, RFID, BLE, or other short-range network protocol.

As in block 920, a unique identifier may be received for the electrical device detected by the network addressable power socket. The unique identifier may be encoded in an electromagnetic tag (NFC or RFID) that may be read using an electromagnetic reader integrated in the network addressable power socket. After reading the electromagnetic tag, the network addressable power socket may send the unique identifier over the computer network to an automation service.

As in block 930, the network addressable power socket and the electrical device may be identified using the power socket identifier and the unique identifier. For example, a power socket profile and an electrical device profile may be identified using the power socket identifier and the unique identifier. The power socket profile and the electrical device profile may include details for the network addressable power socket and the electrical device that may be used to identify an automation rule as explained earlier.

As in block 940, an automation rule that determines in part the functionality of the electrical device may be obtained. For example, the automation rule may be associated with either of the network addressable power socket or the electrical device, or may be associated with both the network addressable power socket and the electrical device. Also, the automation rule may be associated with some characteristic of the network addressable power socket and/or the electrical device.

As in block 950, the automation rule may be applied. In one example, the automation rule may be applied to the network addressable power socket resulting in controlling the electrical device via the network addressable power socket. In another example, the automation rule may be applied to the electrical device. For example, the electrical device may be in communication with a network service and therefore may be capable of receiving commands from the network service. In applying the automation rule, the network addressable power socket and/or the electrical device may be controlled via a network service that executes the automation rule. For example, an automation service may be used to execute the automation rule.

Figure 10:
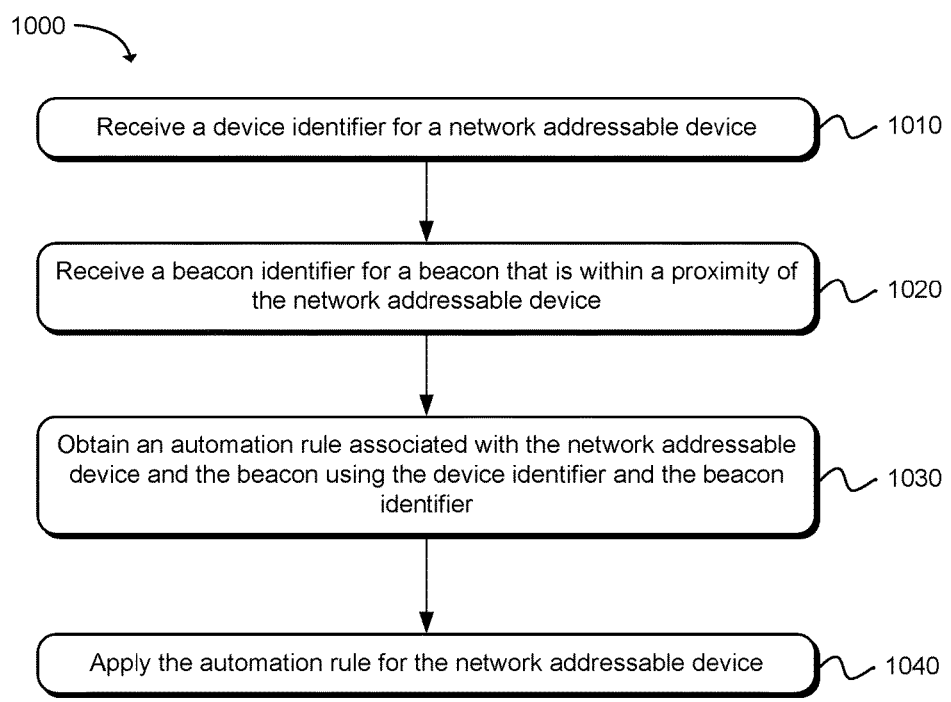
FIG. 10 is a flow diagram that illustrates an example method for identifying and applying an automation rule to a network addressable device according to the proximity of the network addressable device to a beacon.

FIG. 10 is a flow diagram illustrating an example method 1000 for identifying and applying an automation rule to a network addressable device according to the proximity of the network addressable device to a beacon. Beginning in block 1010, a device identifier for a network addressable device may be received over a computer network. The device identifier may be a unique identifier used by an automation service to identify automation rules and/or function profiles that are associated with the network addressable device.

As in block 1020, a beacon identifier for a beacon that may be within proximity of the network addressable device may be received over the computer network. The beacon identifier may be a unique identifier used by the automation service to identify automation rules and/or function profiles that are associated with the beacon. Illustratively, the device identifier and the beacon identifier may be received together in a single message sent by the network addressable device that may be configured to detect the beacon via a signal transmitted by the beacon.

As in block 1030, an automation rule associated with the network addressable device and the beacon may be obtained using the device identifier and the beacon identifier. The automation rule may specify a functional behavior of the network addressable device as a result of being in proximity to the beacon as described earlier.

As in block 1040, the automation rule may be applied to the network addressable device. In one example, applying the automation rule for the network addressable device may result in the network addressable device being controlled via a network service that executes an automation rule. In another example, the automation rule may be sent to the network addressable device that then implements the automation rule.

Figure 11:
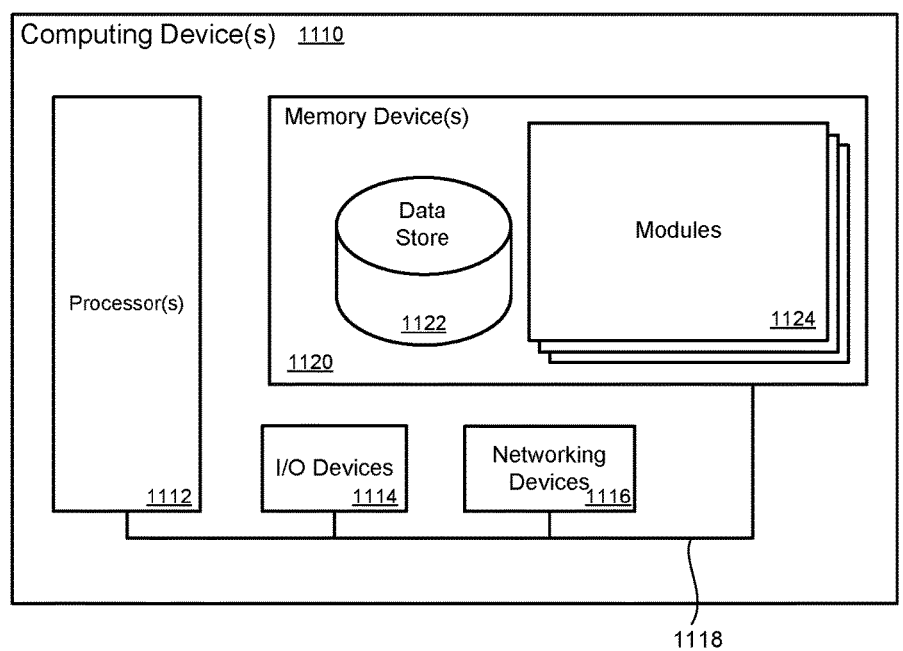
FIG. 11 is block diagram illustrating an example of a computing device that may be used to execute a method for identifying and applying an automation rule to a network addressable device.

FIG. 11 illustrates a computing device 1110 on which modules of this technology may execute. A computing device 1110 is illustrated on which a high level example of the technology may be executed. The computing device 1110 may include one or more processors 1112 that are in communication with memory devices 1120. The computing device 1110 may include a local communication interface 1118 for the components in the computing device. For example, the local communication interface 1118 may be a local data bus and/or any related address or control busses as may be desired.

The memory device 1120 may contain modules 1124 that are executable by the processor(s) 1112 and data for the modules 1124. In one example, the memory device 1120 may include a rule identification module, a rule execution module, a device state module, and other modules. The modules 1124 may execute the functions described earlier. A data store 1122 may also be located in the memory device 1120 for storing data related to the modules 1124 and other applications along with an operating system that is executable by the processor(s) 1112.

Other applications may also be stored in the memory device 1120 and may be executable by the processor(s) 1112. Components or modules discussed in this description that may be implemented in the form of software using high programming level languages that are compiled, interpreted or executed using a hybrid of the methods.

The computing device may also have access to I/O (input/output) devices 1114 that are usable by the computing devices. Networking devices 1116 and similar communication devices may be included in the computing device. The networking devices 1116 may be wired or wireless networking devices that connect to the internet, a LAN, WAN, or other computing network.

The components or modules that are shown as being stored in the memory device 1120 may be executed by the processor(s) 1112. The term "executable" may mean a program file that is in a form that may be executed by a processor 1112. For example, a program in a higher level language may be compiled into machine code in a format that may be loaded into a random access portion of the memory device 1120 and executed by the processor 1112, or source code may be loaded by another executable program and interpreted to generate instructions in a random access portion of the memory to be executed by a processor. The executable program may be stored in any portion or component of the memory device 1120. For example, the memory device 1120 may be random access memory (RAM), read only memory (ROM), flash memory, a solid state drive, memory card, a hard drive, optical disk, floppy disk, magnetic tape, or any other memory components.

The processor 1112 may represent multiple processors and the memory device 1120 may represent multiple memory units that operate in parallel to the processing circuits. This may provide parallel processing channels for the processes and data in the system. The local interface 1118 may be used as a network to facilitate communication between any of the multiple processors and multiple memories. The local interface 1118 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system for controlling an electrical device using a network addressable power socket, comprising:
  at least one processor;
  at least one memory device including instructions that, when executed by the at least one processor, cause the system to:
  register a tag identifier for a NFC (Near Field Communication) tag located with an electrical plug of the electrical device, at an automation service hosted in a computing service environment, wherein the tag identifier is associated with an automation rule;
  receive, at the automation service, a power socket identifier for the network addressable power socket from the network addressable power socket having a NFC reader that is configured to read the NFC tag located with the electrical plug of the electrical device engaged with the network addressable power socket;

receive, at the automation service, from the network addressable power socket the tag identifier for the NFC tag located with the electrical plug of the electrical device;

obtain the automation rule that is associated with the tag identifier; and apply the automation rule associated with the tag identifier to the network addressable power socket to control the electrical device using the network addressable power socket.

2. A system as in claim 1, wherein the memory device includes instructions that, when executed by the at least one processor, causes the system to further identify an electrical device profile that identifies the electrical device and the automation rule that is associated with the electrical device.

3. A system as in claim 1, wherein the memory device includes instructions that, when executed by the at least one processor, causes the system to further identify a power socket profile that identifies a location of the network addressable power socket.

4. A system as in claim 1, wherein the memory device includes instructions that, when executed by the at least one processor, causes the system to further determine that the automation rule associated with the tag identifier corresponds with a location of the network addressable power socket.

5. A computer implemented method, comprising:

registering a unique identifier for an electrical device, at an automation service hosted in a computing service environment, wherein the unique identifier is associated with an automation rule;

receiving, at the automation service, via a computer network, a power socket identifier for a network addressable power socket which detects the electrical device connected to the network addressable power socket by way of a wireless communication protocol;

receiving, at the automation service, via the computer network, a unique identifier for the electrical device detected by the network addressable power socket;

identifying the network addressable power socket and the electrical device using the power socket identifier and the unique identifier;

obtaining the automation rule that defines functionality of the electrical device as controlled by the network addressable power socket; and applying the automation rule to the network addressable power socket.

6. A method as in claim 5, wherein registering the unique identifier further comprises registering a tag identifier for a RFID (Radio Frequency Identification) tag that associates the RFID tag with the electrical device, wherein the network addressable power socket is configured with an RFID reader that detects the RFID tag.

7. A method as in claim 5, wherein the unique identifier for the electrical device is transmitted to the network addressable power socket via a short-range wireless network.

8. A method as in claim 7, further comprising receiving sensor data from the electrical device that is sent to the network addressable power socket via the short-range wireless network.

9. A method as in claim 5, further comprising receiving a profile for the electrical device specifying characteristics of the electrical device that can be controlled via the network addressable power socket.

10. A method as in claim 9, further comprising determining that the characteristics of the electrical device are compatible with a group profile that includes the network addressable power socket.

11. A method as in claim 5, further comprising recording an occupied state of the network addressable power socket in a power socket profile, wherein the occupied state indicates whether the electrical device is connected to the network addressable power socket.

12. A method as in claim 5, wherein obtaining the automation rule further comprises obtaining an automation rule that is associated with a characteristic of the electrical device.

13. A method as in claim 5, wherein the automation rule is associated with the network addressable power socket or the electrical device.

14. A method as in claim 5, wherein the automation rule comprises an action that is performed according to a condition, schedule, or request.

15. A method as in claim 5, further comprising receiving identity data via a gateway server that provides access to network services located in a computing service environment.

16. A method as in claim 15, wherein the network addressable power socket includes a wireless radio that is in communication with the computer network allowing the network addressable power socket to communicate with network services via the gateway server.

17. A method as in claim 15, wherein the network addressable power socket includes a power-line network adapter that is in communication with the computer network allowing the network addressable power socket to communicate with network services via the gateway server.

18. A non-transitory machine readable storage medium having instructions embodied thereon, the instructions when executed by a processor:

register an electrical device profile for an electrical device, at an automation service hosted in a computing service environment, wherein the electrical device profile includes a unique identifier for the electrical device and a characteristic of the electrical device;

receive, at the automation service, identity data that identifies a network addressable power socket and a unique identifier for the electrical device connected to the network addressable power socket which includes an electromagnetic reader configured to detect the electrical device using a wireless communication protocol;

identify the network addressable power socket using the identity data;

identify the electrical device profile for the electrical device using the unique identifier for the electrical device;

obtain an automation rule for a group of network addressable devices that includes the network addressable power socket and the electrical device;

determine that the electrical device is compatible with the automation rule using the characteristic included in the electrical device profile; and apply the automation rule for the group of network addressable devices to an automation profile for the network addressable power socket to control the electrical device.

19. A non-transitory machine readable storage medium as in claim 18, wherein the instructions that when executed by the processor further:
- receive notice that the electrical device is not connected to the network addressable power socket; and
- disassociate the automation rule from the automation profile.

20. A non-transitory machine readable storage medium as in claim 18, wherein the instructions that when executed by the processor further execute an automation rule user interface used to create, modify, and delete automation rules.

* * * * *